United States Patent Office 3,706,633
Patented Dec. 19, 1972

3,706,633
PREPARATION OF WATER-INSOLUBLE ENZYME DERIVATIVES
Ephraim Katchalski and Leon Goldstein, Rehovot, Yehuda Levin, Tel-Aviv, and Shmaryahu Blumberg, Rishon le Zion, Israel, assignors to Monsanto Company, St. Louis, Mo.
No Drawing. Filed Apr. 10, 1970, Ser. No. 27,423
Int. Cl. C07g 7/02
U.S. Cl. 195—63                                     11 Claims

ABSTRACT OF THE DISCLOSURE

Water-insoluble, enzymatically-active compositions comprise dialdehyde starch, an active enzyme, and an alkylene diamine binding said enzyme to said starch. The compositions are prepared by condensing dialdehyde starch with alkylene diamine, reducing and diazotizing the resulting polymeric product to produce a polymeric polydiazonium salt, and thereafter coupling the enzyme to said polydiazonium salt.

BACKGROUND OF THE INVENTION

(1) Field of invention

Polymeric enzyme products and their production.

(2) Prior art

Enzymes and their many uses are well established in the art. Recent efforts in the art have been directed toward developing insoluble forms of enzymes which nevertheless are enzymatically active. Such enzyme derivatives are useful as easily removable reagents having improved shelf-life and also are well suited for repeated and/or continuous use in and provide means for improved control of enzyme catalyzed reactions.

Methods presently available for the immobilization of enzymes have been summarized by Goldstein et al., Z. Anal. Chem. 243, 375 (1968), and Silman et al., Ann. Rev. Biochem. 35, 873 (1966). Among these methods are the covalent linking of enzymes to carboxylic polymers via the corresponding azides, or by activation of the polymer carboxyls by carbodiimides or Woodward's Reagent K (N-ethyl-5-phenylisoxazolium-3′-sulfonate). Additionally, it is known to immobilize enzymes with cellulose activated by cyanuric chloride or by a dichloro-sym-triazinyl dystuff. Also, a polymeric acylating reagent, ethylene-maleic anhydride (1:1) copolymer has been successfully utilized for the preparation of polyanionic water-insoluble derivatives of enzymes. However, the chemical nature of the enzyme carrier, particularly of the polyanionic carriers, may impose restrictions on the specificity of the particular enzyme bound thereto, therefore it would be highly desirable to bind enzymes to a neutral carrier material.

It has now been found that active, water-insoluble enzyme derivatives can be prepared by covalently binding an active enzyme to a neutral synthetic resin by means of an alkylene diamine. The obtained products possess the desired insolubility, are enzymatically active and relatively stable. Moreover, the products are particulate in form, are readily filterable, and can be conveniently used in reactor columns.

SUMMARY OF THE INVENTION

The present invention contemplates water-insoluble, enzymatically active compositions containing dialdehyde starch having from about 15 to about 100 percent of 2,3-alcohol groups thereof oxidized to dialdehyde groups, an active enzyme, and an alkylene diamine binding said enzyme to said starch. These compositions are prepared by condensing the dialdehyde starch with an alkylene diamine to produce a polymeric product, reducing and diazotizing the product, so as to produce a polymeric polydiazonium salt which is then coupled with an active enzyme. A water-insoluble, active enzyme modified dialdehyde starch conjugate containing up to about 10 percent by weight, or more, of the enzyme can be prepared.

DESCRIPTION OF THE PREFERRED EMBODIMENTS

Dialdehyde starches suitable for the purposes of the present invention are starches in which about 15 to about 100 percent, preferably at least about 90 percent of the 2,3-alcohol groups have been converted to aldehyde groups by oxidation. Such 2,3-dialdehyde starches are known and have been described in literature, for example, in U.S. Pats. 2,648,629, 2,713,553 and 2,880,236, and are also available commercially under the name of "Sumstar," a product of Miles Laboratories, Elkhart, Ind., prepared by a periodate oxidation of starch.

Suitable alkylene diamines are those containing from about 4 to about 18 carbon atoms and include aliphatic diamines such as tetramethylene diamine, pentamethylene diamine, hexamethylene diamine, octamethylene diamine, and the like, preferably containing 4 to 8 carbon atoms, as well as aromatic alkylene diamines such as methylene dianiline, ethylene dianiline, hexamethylene dianiline, and the like, preferably containing 7 to 18 carbon atoms, and also mixtures of the foregoing aliphatic diamines with aromatic alkylene diamines. For enzyme attachment to the carrier resin the presence of at least a small amount of an aromatic alkylene diamine is preferred, because the aromatic alkylene diamines are much more readily diazotizable. An alkylene diamine is present in an amount in the range from about 35 weight percent to about 55 weight percent, preferably from about 45 weight percent to about 55 weight percent, based on the dialdehyde starch. Preferably at least about 10 weight percent, based on the dialdehyde starch, of an aromatic alkylene diamine is present.

In preparing the compositions of this invention the dialdehyde starch is first condensed, at about room temperature and in a suitable reaction medium, with the alkylene diamine to produce a highly cross-linked polymeric product which is then reduced with a complex metal hydride such as lithium aluminum hydride or an alkali metal borohydride such as sodium borohydride, lithium borohydride or the like. The product is then diazotized to produce a corresponding polydiazonium salt which, in turn, is coupled with the desired enzyme. The preparation of the enzyme carrier resin is believed to proceed according to the following scheme:

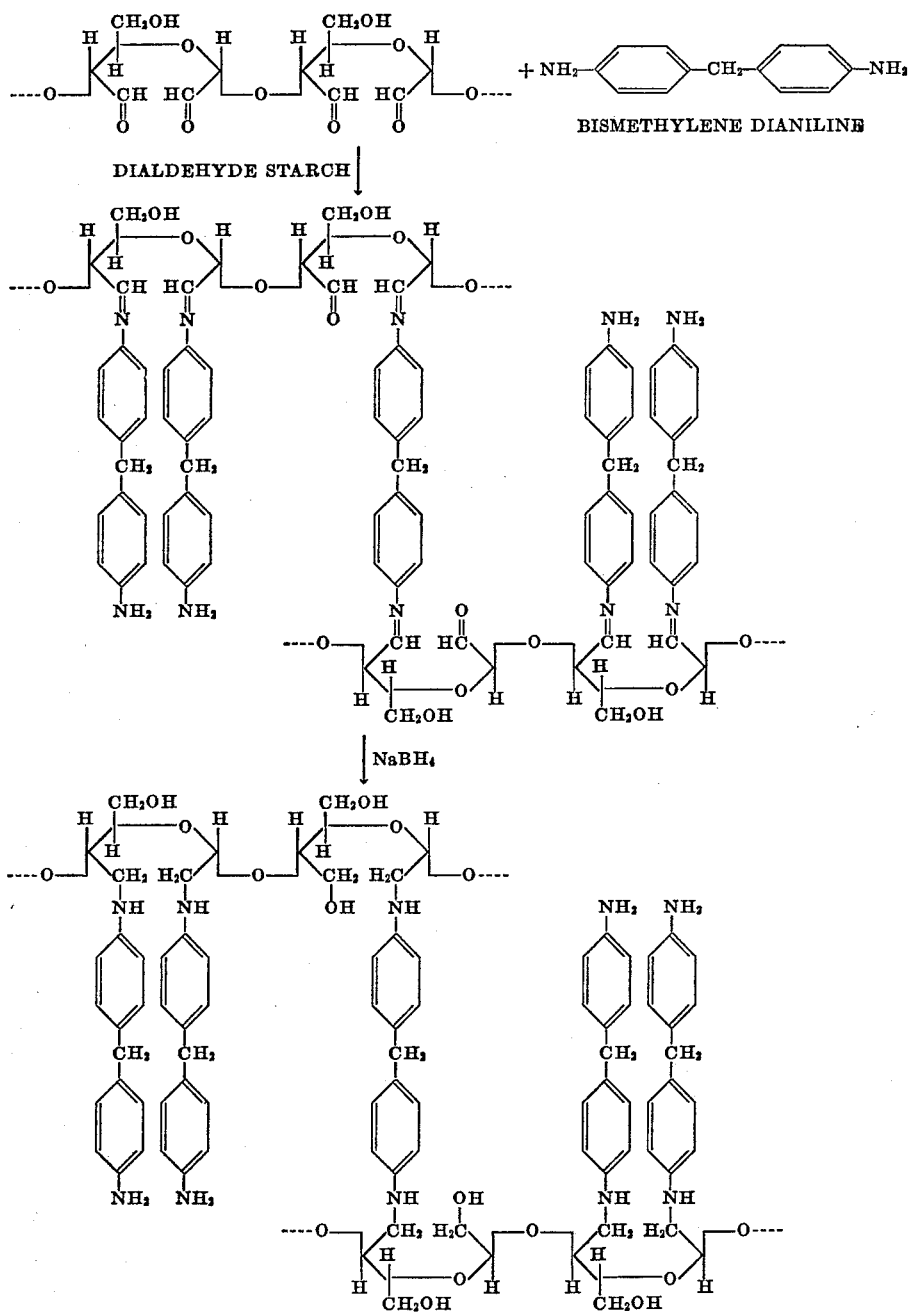

The enzyme starting material may be obtained from any suitable source, whether vegetable, animal, or microbial. Many such enzymes are available commercially. For example, a protease or a mixture of proteases, e.g., acid and/or neutral and/or alkaline protease can be insolubilized. In addition to the aforesaid protease mixtures, mixtures of a protease with another, differently active enzyme can be used for maximum operative enzymatic activity. An amylase is preferred, but a lipase or cellulase may be used instead of or in addition to the amylase. A carbohydrase, lipase, esterase, nuclease, or other type of hydrolase may be an additional enzyme reactant. A hydrase, oxidoreductase, or demolase may also be employed, or a transferase or isomerase, depending upon the ultimate activity and application intended.

Many such enzymes can conveniently be obtained from microorganisms which include bacteria, yeasts, fungi and the like by using well-known fermentation methods such as those generally described in Kirk-Othmer, Encyclopedia of Chemical Technology 8, 173–204. A great many microbially-produced enzymes are available commercially.

The exact activity of the enzyme or enzymes employed as starting material depends on the exact method of preparation and is not critical to the present invention providing only that the enzymatically active insoluble product produced therefrom has the desired enzymatic activity. Various analytical methods are available to determine the activity of enzymatically active material, for example, the protease activity of proteolytic enzymes can be determined by well-known casein digestion methods. According to such methods, a protease catalyzes the hydrolysis of casein for a certain period of time and temperature and at a certain pH; the reaction is stopped by the addition of trichloroacetic acid, and the solution is filtered. The color of the filtrate is developed by Folin phenol reagent, and the level of enzyme activity is measured spectrophotometrically in units of casein tyrosine. This method is more fully described in the Journal of General Physiology 30, 291 (1947) and in Methods of Enzymology 2, 33, Academic Press, New York (1955). Amylase activity is generally determined by the well-known dinitrosalicyclic acid method of Bernfeld. Still other test procedures are known in the art and some are set forth hereinafter.

Another effective source of mixed enzymes which can be used as starting material in the present invention is a mutated *Bacillus subtilis* organism. The process for producing this organism and enzymes therefrom is described in U.S. Pat. 3,031,380. A culture of this *Bacillus subtilis* (strain AM) organism has been deposited with the U.S. Department of Agriculture, Agricultural Research Service, Northern Utilization Research and Development Division, 1815 N. University St., Peoria, Ill. 61604, and has been assigned No. NRRL B-3411. The enzymatically active material produced by this organism has been found generally to consist of two proteases, approximately 65–76% neutral protease (activity at a pH of 7.0–7.5) and about 25–35% alkaline protease (activity at a pH of 9 to 10). A significant amount of amylase is also present. There are generally about 700 thousand to about 1.2 million units of neutral protease activity per gram of isolated solids and about 250 thousand to about 400 thousand units of alkaline protease activity per gram as determined by Anson's Variation of the Kunitz "Casein" method. There are generally about 300 thousand to 350 thousand units of amylase activity per gram as determined by the Bernfeld method. As pointed out in the above-cited patent, the relative proportions of protease to amylase will vary depending on the exact conditions of growth of the microorganism but it has been found that the neutral and alkaline protease and the amylase will be produced, in at least some amounts, almost regardless of changes in the culture medium and other conditions of growth of the microorganism. The ratio of the activity of the alkaline protease to the activity of the neutral protease in the starting materials and in the insoluble product is preferably about 0.25–1.2 to one.

A still further source of mixed enzymes which can be used as starting material when practicing the present invention is *B. subtilis* strain NRRL 644, *B. subtilis* strain NRRL 941, and *B. subtilis* strain IAM 1523 (Japanese Culture Collection). Still other *B. subtilis* microorganisms are available which produce protease, a mixture of proteases, or protease and amylase, at least to a limited if not optimum extent. The so-called *Streptomyces griseus* neutral protease has a broad pH activity range and may constitute one starting enzyme for incorporation into the products of the invention.

Other typical enzymes are trypsin, chymotrypsin, pepsin, papain, carboxypeptidase, rennin, and the like.

Insolubilization according to the present invention is carried out by combining a desired enzyme in an appropriate buffered solution depending on the pH desired with the dialdehyde starch-alkylene diamine carrier resin. If tolerated by the particular enzyme, a slightly basic pH range is preferred. Any temperature which does not tend to inactivate the enzyme may be employed. Temperatures above about 60° C. should generally be avoided. The present process is readily carried out at ambient room temperatures or lower. The temperature of choice, of course, will vary depending mainly upon the particular enzyme employed, being usually in the range from about −5° C. to about 30° C. A temperature in the range from about 0° C. to about 10° C. is preferred.

A convenient reaction medium is water. The produced insoluble enzyme product is usually recovered therefrom by filtration, centrifugation, or the like, with or without a pH adjustment.

Enzymes are bonded by covalent linkages to the carrier resin by diazotizing the resin in a conventional manner and coupling the resulting polymeric polydiazonium salt to the desired enzyme in an aqueous solution. In some instances the direct coupling of an enzyme, for example trypsin, may lead to excessive inactivation of the enzyme. In such an event polytryosyl or similar side chains can be grown onto the enzyme, e.g., trypsin, by initiating the polymerization of N-carboxy-L-tyrosine anhydride, a known, commercially available product, with the enzyme in an aqueous solution. Highly active, water-insoluble enzyme-resin conjugates are then obtained by coupling the polytyrosyl-enzyme derivative with the polydiazonium salt of the carrier resin.

The following examples further illustrate the present invention.

EXAMPLE 1

Preparation of carrier resin with methylene dianiline

Ninety percent-oxidized dialdehyde starch (10 grams) is suspended in water (200 milliliters) and stirred for about 10 to 15 minutes at room temperature to produce a fine slurry, 2 M Carbonate buffer, pH 10.5 (40 milliliters) is added thereto and the suspension is slowly poured into a vigorously stirred, 10-weight percent solution of methylene dianiline in methanol (300 milliliters). Thereafter the stirring of the resulting reaction mixture is continued for about 2 to 3 days and then an insoluble polymeric Schiff's base is recovered therefrom, washed with methanol, resuspended in water, and reduced with sodium borohydride (40 grams).

The resulting mixture is then neutralized with acetic acid and the produced resin washed with water and methanol, and thereafter refluxed in methanol (3 to 4 changes, 300 milliliters each) so as to remove any methanol soluble aromatic amines that may be present, until a negative test is obtained with N,N-dimethylaminobenzaldehyde (Ehrlich's Reagent). Thereafter the resin is filtered and dried. About 14 to 15 grams of dry resin is produced.

The diazotization capacity of the produced resin is estimated by coupling the polydiazonium salt with p-bromophenol and determining the nitrogen and bromine content of the resulting product. The resin (50 milligrams) is suspended in 50-weight percent acetic acid (4 milliliters) and stirred for one hour over ice. An aqueous solution of sodium nitrate (10 milligrams per milliliter of water) is then added dropwise to the chilled suspension. The obtained diazotization mixture is further stirred for one hour over ice and then brought to pH 8.5 by dropwise addition of aqueous 5 N solution of sodium hydroxide.

The produced precipitate is recovered, washed with cold 0.2 M phosphate buffer, pH 7.8, and suspended in the same buffer (5 milliliters). A solution of p-bromophenol (50 milligrams dissolved in water by the dropwise addition of aqueous 2 N sodium hydroxide) is then added to the chilled suspension. The resulting reaction mixture is stirred for about 16 hours at about 4° C. and the precipitate separated by filtration, washed with 0.1 M carbonate buffer (pH 10.5), water, and methanol, and dried in vacuum over phosphorus pentoxide. The nitrogen and bromine contents of the dry resin are determined by the Dumas and Schöniger combustion methods, respectively, as set forth in Steyermark, "Quantitative Organic Microanalysis," 2nd ed., Academic Press, New York, 1961.

The enzyme binding capacity of the produced resin is estimated from saturation curves obtained by coupling its polydiazonium salt with varying amounts of an enzyme and determining the enzymic activity of the produced reaction mixture supernatants and insoluble precipitates, or by determining the amino acid composition of acid hydrolyzates of the latter.

Nitrogen content of the produced resin is about 6.5 to 6.8 percent by weight, and the diazotization capacity is about 0.24 to 0.26 milliequivalent per gram. The enzyme binding capacity is about 8 to 10 milligrams of enzyme per 100 milligrams resin.

EXAMPLE 2

Preparation of carrier resin with hexamethylene diamine

Ninety percent-oxidized dialdehyde starch (1.6 grams) is suspended in water (20 milliliters), and the resulting suspension brought to pH 11.2 and vigorously stirred. An aqueous solution of hexamethylene diamine (1.16 grams in 2 milliliters) is slowly added thereto. The reaction is permitted to proceed for about 16 hours at room temperature, the pH of the reaction mixture being monitored by a pH-stat. Thereafter a dark brown precipitate is recovered from the reaction mixture, washed with water, methanol, and diethyl ether, and then dried in vacuum over concentrated sulfuric acid. About 1.5 grams of resin is obtained.

A portion of the obtained resin (200 milligrams) is suspended in water (5 milliliters), vigorously stirred, and a methanol solution of methylene dianiline (about 150 milligrams in 1.5 milliliters of methanol) is added slowly to the stirred suspension. The pH of the resulting admixture is maintained at 10.8 by the addition of aqueous 0.1 N sodium hydroxide solution as required. The admixture is stirred at room temperature for about 16 hours. Thereafter an insoluble resin is recovered therefrom, washed with methanol until free from methanol-soluble aromatic amines as indicated by a negative test with N,N-dimethylaminobenzaldehyde (Ehrlich's Reagent), washed with diethyl ether and dried in vacuum over sulfuric acid. Net weight of the produced dry resin is 220 milligrams.

The produced resin (146 milligrams) is suspended in water (5 milliliters) and sodium borohydride (200 milligrams) added thereto. The resulting admixture is stirred for about 16 hours at room temperature. The obtained reduced resin is recovered from the admixture, washed with an aqueous actic acid solution and then with water.

The washed resin is suspended in cold aqueous 1 N HCl solution (3 milliliters), aqueous sodium nitrite solution (1.46 milligrams NaNO$_2$ in 1 milliliter of water) added dropwise thereto, and the suspension stirred for 90 minutes. Thereafter pH of the suspension is adjusted to 7.7 by the addition of aqueous 0.1 N sodium hydroxide solution and the suspension is employed directly in the coupling of enzyme to the produced diazotized resin.

EXAMPLE 3

Coupling of papain to the carrier resin

Papain (10 milligrams) is dissolved in 0.1 M phosphate buffer, pH 7.7, (10 milliliters) and a portion of the suspension of diazotized resin produced in Example 2 is added to the solution. The resulting admixture is stirred for about 16 hours at 4° C. Thereafter the resin is recovered, washed with water, and suspended in 0.1 M phosphate buffer, pH 6.5.

The obtained insoluble papain bearing resin exhibits enzymatic activity as determined by a titrimetric assay at 25° C., pH 6.3, using benzoyl-L-arginine ethyl ester as substrate and aqueous 0.1 N sodium hydroxide solution as titrant according to the procedure set forth by Jacobsen et al., "Methods of Biochemical Analysis" (D. Glick, ed.), vol. 4, page 171 (1957).

EXAMPLE 4

Coupling of mercuripapain to carrier resin

Dialdehyde starch methylene dianiline resin (100 milligrams) prepared and diazotized as in Example 1, is washed and the washed polydiazonium salt precipitate is suspended in 0.2 M phosphate buffer, pH 7.8 (6 milliliters), a solution of mercuripapain (8 to 10 milligrams) is added dropwise thereto, and the resulting admixture stirred for about 16 hours at 4° C. The produced insoluble mercuripapain-carrier resin conjugate is recovered by filtration on a Buchner funnel, washed with aqueous 1 M potassium chloride solution (200 milliliters), then with water (100 milliliters), and resuspended in water.

The produced conjugate is assayed in the same manner as papain and exhibits an enzymatic activity of about 60 percent of that exhibited by unbound mercuripapain. The mercuripapain-resin conjugate retains enzymatic activity upon storage as an aqueous suspension or as a lyophilized or dried powder.

The caseinolytic activity of the produced conjugate is similar to that of the native enzyme as calculated on the basis of the respective esterase activities. The conjugate can be easily removed from a digestion mixture by filtration or centrifugation, it has good flow properties and thus is suitable for column work.

EXAMPLE 5

Preparation of polytyrosyl trypsin

Trypsin (1 gram) is dissolved in an aqueous 0.0025 N HCl solution (36 milliliters) and 0.1 M phosphate buffer, pH 7.6 (36 milliliters) added to the resulting solution. The final pH of the solution is 7.2. The solution is then chilled in an ice-bath and a solution of N-carboxy-L-tyrosine anhydride (800 milligrams) in anhydrous dioxane (16 milliliters) is added dropwise with stirring. A milky reaction mixture is obtained and is stirred magnetically for 16 hours at 4° C. and then exhaustively dialyzed against aqueous 0.0025 N HCl solution (6 liters changed daily for about 7 days) until a clear solution is obtained which is further clarified by centrifugation if traces of insoluble material are still present after dialysis. Thereafter the solution is lyophilized and stored at 4° C. Protein yield and recovery of enzymatic activity are almost quantitative.

Polytyrosyl trypsin is assayed in the same manner as trypsin, i.e., titrimetrically at 25° C., pH 8, using benzoyl-L-arginine ethyl ester as substrate and 0.1 N NaOH as titrant by the procedure set forth by Jacobsen et al., op. cit.

EXAMPLE 6

Carrier resin-polytyrosyl trpysin conjugate

Dialdehyde starch-methylene dianiline resin (100 milligrams) prepared as in Example 1 is suspended in aqueous 50 weight percent acetic acid solution (8 milliliters) and the suspension stirred for one hour over ice and afterwards an aqueous solution of sodium nitrite (20 milligrams in one milliliter of water) is added dropwise to the chilled suspension. The resulting diazotization mixture is stirred for one hour over ice and then brought to pH 8.5 by the dropwise addition of aqueous 5 N solution of sodium hydroxide. Crushed ice is added as required to maintain the mixture at a relatively low temperature.

The polydiazonium salt of the resin separates as a dark brown, lumpy precipitate which is recovered on a Buchner funnel, washed with cold 0.2 M phosphate buffer (pH 7.8), and suspended in the same buffer (10 milliliters).

A solution of polytyrosyl trypsin (30 milligrams in 8 milliliters of aqueous 0.001 N HCl) is then added to a chilled suspension of the diazotized resin and the coupling reaction allowed to proceed for about 16 hours at 4° C. with stirring. The carrier resin-polytyrosyl trypsin conjugate is recovered from the suspension by filtration, washed with an aqueous 1 M potassium chloride solution (100 to 200 milliliters), and then with water. Thereafter the conjugate is resuspended in water or in 0.1 M phosphate buffer, pH 7.0.

Enzymatic activity of the conjugate is assayed in the same manner as for trypsin at pH 10, the amount of active enzyme being calculated from the rate of substrate hydrolysis. The protease activity of the conjugate is determined at pH 7.6 by the casein digestion method of Kunitz, J. Gen. Physiol, 30, 291 (1947).

Bound protein determination is carried out by hydrolyzing the conjugate in an evacuated sealed tube using aqueous 6 N HCl for 48 hours at 110° C. The acid is evaporated and the residue suspended in 0.2 M citrate buffer pH 2.2 (4 milliliters). Insoluble colored material is removed by strong centrifugation and amino acid analysis is carried out employing an automatic amino acid analyzer. The amount of protein present is calculated from the amounts of alanine, leucine, glycine, and valine.

The recovery of enzymatic activity in the prepared conjugate is found to be about 40 percent based on polytyrosyl trypsin. Aqueous suspensions of the enzymatically active conjugate can be stored at 4° C. for long periods of time without a significant loss of activity.

The caseinolytic activity of the prepared conjugate is about 30 percent that of crystalline trypsin or polytyrosyl trypsin.

The pH activity profile of the conjugate acting on benzoyl-L-arginine ethyl ester substrate is displaced by about two pH units toward more alkaline pH values as compared to the unbound enzyme under similar conditions. The pH optimum for the insoluble conjugate lies in the pH range from about 10 to about 10.5.

EXAMPLE 7

Carrier resin-subtilopeptidase A conjugate

In a manner similar to Example 6, dialdehyde starch-methylene dianiline resin (100 milligrams) is diazotized. The washed diazonium salt precipitate is suspended in 0.2 M phosphate buffer, pH 7.8, (4 milliliters) and a solution of subtilopeptidase A (15 milligrams in 3 milliliters of the same buffer) is added dropwise thereto. The resulting reaction mixture is stirred for about 16 hours at 4° C. A water-insoluble subtilopeptidase A-resin conjugate is recovered from the reaction mixture by filtration, washed with aqueous 1 M potassium chloride solution (200 milliliters), then with water (100 milliliters), and resuspended in water or in aqueous 0.1 M phosphate buffer, pH 7.0.

The produced conjugate is assayed in the same manner as subtilopeptidase A at pH 9.4 and exhibits a recovery of enzymatic activity of about 15 to 20 percent, based on subtilopeptidase A. The amount of active enzyme present is calculated from the rates of substrate hydrolysis.

Protease activity of the conjugate is determined at pH 7.6 by the casein digestion method of Kunitz, op. cit. The activity is slightly lower than that of the unbound enzyme.

The produced enzymatically active, water-insoluble conjugate can be stored in aqueous or dilute buffer (pH 7) suspensions at 4° C. for relatively long periods of time without a significant loss of enzymatic activity.

The pH-activity profile of the produced subtilopeptidase A-resin conjugate with acetyl-L-tyrosine ethyl ester as substrate is displaced by about one pH unit at low ionic strength ($\Gamma/2=0.01$) towards more alkaline pH values as compared to crystalline subtilopeptidase A. The pH optimum of the prepared conjugate is in the range from about 9.2 to 9.6.

EXAMPLE 8

Coupling of polytyrosyl trypsin to resin

Polytyrosyl trypsin (20 milligrams) is dissolved in 0.1 M phosphate buffer, pH 7.7 (5 milliliters) and a suspension of diazotized resin produced in accordance with Example 2 is added thereto and the resulting reaction mixture stirred for 16 hours at 4° C. An insoluble reddish-brown precipitate is then recovered from the reaction mixture, washed with water, suspended in 0.1 M phosphate buffer, pH 7.0, and assayed for activity.

Recovery of enzymatic activity in the produced polytyrosyl trypsin-resin conjugate is about 25 to 30 percent, based on unbound polytyrosyl trypsin.

EXAMPLE 9

Coupling of polytyrosyl chymotrypsin to resin

Polytyrosyl chymotrypsin is prepared from chymotrypsin in a manner similar to the preparation of polytyrosyl trypsin from trypsin set forth in Example 5.

Thereafter a water-insoluble polytyrosyl chymotrypsin-resin conjugate is prepared following the procedure of Example 8. Recovery of enzymatic activity in the produced polytyrosyl chymotrypsin conjugate is about 15 to 20 percent based on unbound polytyrosyl chymotrypsin.

The foregoing discussion and the examples are illustrative. Still other variations within the spirit and scope of this invention will readily present themselves to the skilled artisan.

We claim:
1. Process for preparing a water-insoluble, enzymatically-active composition which comprises the steps of
   condensing dialdehyde starch, having from about 15 to 100 percent of 2,3-alcohol groups thereof oxidized to aldehyde groups, with an alkylene diamine so as to produce a polymeric product;
   reducing the polymeric product with a complex metal hydride;
   diazotizing the reduced polymeric product so as to form a polymeric polydiazonium salt; and
   coupling said polymeric polydiazonium salt with an enzyme.
2. The process of claim 1 wherein at least 90 percent of said 2,3-alcohol groups are oxidized to aldehyde groups.
3. The process of claim 1 wherein the complex metal hydride is sodium borohydride.
4. The process of claim 1 wherein the alkylene diamine is methylene dianiline.
5. The process of claim 1 wherein the alkylene diamine is hexamethylene diamine mixed with methylene dianiline.
6. The process of claim 1 wherein the enzyme is papain.
7. The process of claim 1 wherein the enzyme is subtilopeptidase A.
8. The process of claim 1 wherein the enzyme is mercuripapain.
9. The process of claim 1 wherein the enzyme is polytyrosyl trypsin.
10. The process of claim 1 wherein the enzyme is polytyrosyl chymotrypsin.
11. A water-insoluble enzymatically-active product produced by the process of claim 1.

References Cited

UNITED STATES PATENTS

| | | | |
|---|---|---|---|
| 3,169,076 | 2/1965 | Borchert | 260—233.3 R |
| 3,167,485 | 1/1965 | Katchalski et al. | 195—63 |
| 3,502,545 | 3/1970 | Westman et al. | 195—63 X |

OTHER REFERENCES

Bauman et al.: Preparation of Immobilized Cholinesterase For Use in Analytical Chemistry, Analytical Chemistry, 1965, vol. 37 (pp. 1378–1381).

Day et al.: Organic Chemistry, D. Van Nostrand Co., Inc., N.Y., 1960 (pp. 217, 218, 401, 402 and 588).

A. LOUIS MONACELL, Primary Examiner

D. M. NAFF, Assistant Examiner

U.S. Cl. X.R.

195—68, DIG 11